United States Patent [19]

Kanai et al.

[11] Patent Number: 5,477,292
[45] Date of Patent: Dec. 19, 1995

[54] MECHANISM FOR DRIVING A DIFFUSION PLATE OF STROBE-LIGHTS

[75] Inventors: Masaharu Kanai; Tokuji Sato; Katsumi Motomura, all of Asaka, Japan

[73] Assignee: Fuji Photo Film Co., Ltd., Kanagawa, Japan

[21] Appl. No.: 184,034

[22] Filed: Jan. 21, 1994

[30] Foreign Application Priority Data

Jan. 26, 1993 [JP] Japan ................................. 5-011137

[51] Int. Cl.⁶ ................................................. G03B 15/03
[52] U.S. Cl. ................................................. 354/149.1
[58] Field of Search ......................... 354/149.1, 150, 354/149.11

[56] References Cited

U.S. PATENT DOCUMENTS 2,408,811  10/1946  Resk .......................................... 354/150
5,126,778   6/1992  Wheeler et al. ....................... 354/149.1

*Primary Examiner*—David M. Gray
*Attorney, Agent, or Firm*—Young & Thompson

[57] ABSTRACT

When a distance measured by an AF range finding section is of a predetermined value or thereabove, even if a slide plate is moved in an interlocking relation with a releasing operation of a release button, a gear is locked by the electromagnetic actuator, whereby a diffusion plate is not moved from a position retracted from a strobe, so that an attainable distance of strobe-lights can be extended. On the other hand, when the distance measured by the AF range finding section is of less than the predetermined value, the slide plate is moved in an interlocking relation with the releasing action of the release button and the gear is rotated through a biasing force of a spring, whereby the diffusion plate is positioned in front of the strobe to cover the strobe. Accordingly, the strobe-lights can be reduced in light quantities, so that the optimal exposure can be attained.

5 Claims, 5 Drawing Sheets

MECHANISM FOR DRIVING A DIFFUSION PLATE OF STROBE-LIGHTS

BACKGROUND OF THE INVENTION

1. Field of the Invention

This invention relates to a camera in which a strobe is equipped.

2. Description of the Related Art

A conventional camera requires a large-capacity strobe so as to extend the attainable distance of the strobe for photographing a subject at a far distance.

However, when the large-capacity strobe is applied to the conventional camera, there is a disadvantage in that light quantity can not be reduced, therefore, the exposure becomes over exposure in the case of photographing a subject at a short distance.

Further, even though a camera equipped with an automatic adjusting-light strobe is used, it is difficult to control a small light quantity, therefore, the exposure becomes too much like the above.

As a result of tile above disadvantage, the strobe which has a small GN (guide number) is applied so that the attainable distance of the strobe is given up at a far distance, or a subject distance is made longer at a short distance. Moreover, there, is another problem in the light distribution characteristic at a short distance.

SUMMARY OF THE INVENTION

This invention has been developed to eliminate the above-described disadvantages and aims to provide a mechanism for driving a diffusion plate of strobe-lights applied to a camera which can attain the optimal exposure during photographing at a short distance though a large-capacity strobe is applied, wherein the strobe-lights are diffused during photographing at a short distance.

To achieve the above-described aim, this invention is characterized in that a mechanism for driving a diffusion plate of strobe-lights comprises: a camera body; a strobe incorporated in said camera body; an AF range finding section secured to said camera body; a diffusion plate of strobe-lights, which is linearly and movably provided in front of said strobe of said camera body; and a means for driving said diffusion plate, for retracting said diffusion plate from the front of said strobe when a distance measured by said AF range finding section is of a predetermined value or thereabove, and for advancing said diffusion plate to the front of said strobe when said distance is of less than the predetermined value.

Further, to achieve the above-described aim, this invention is characterized in that a mechanism for driving a diffusion plate of strobe-lights comprises: a camera body; a strobe incorporated in said camera body; an AF range finding section secured to said camera body; a reflecting mirror for switching the light of a subject which has passed through a taking lens off to either the side of a finder or the side of an exposure surface of a Film; a means for driving a mirror, provided in said camera body, for rocking said reflecting mirror in an interlocking relation with a releasing operation of a shutter; a diffusion plate of strobe-lights, which is linearly and movably provided in front of said strobe of said camera body; a mechanism for driving said diffusion plate for linearly moving said diffusion plate in front of said strobe through a driving Force of said means for driving a mirror; and a means for interrupting a driving force, for interrupting the transmission of the driving force to said mechanism for driving said diffusion plate not to position it in front of said strobe when a distance measured by said AF range finding section is of a predetermined value or thereabove, and for positioning said diffusion plate in front of said strobe by said means for driving a mirror when said distance is of less than the predetermined value.

According to this invention, the means for interrupting a driving force interrupts the transmission of the driving force to the diffusion plate in the mechanism for driving the diffusion plate when a distance measured by said AF range finding section is of a predetermined value or thereabove. With this arrangement, even if the means for driving a mirror is driven in an interlocking relation with a releasing operation of the shutter, the diffusion plate is not positioned in front of the strobe, therefore, tile attainable distance of strobe-lights can be extended. Moreover, tile driving force is transmitted to the diffusion plate in the mechanism for driving the diffusion plate when said distance is less than the predetermined value. With this arrangement, the means for driving a mirror is driven in an interlocking relation with the releasing operation of the shutter, whereby the diffusion plate is positioned in front of the strobe and the strobe lights are diffused, therefore, the optimal exposure can be attained.

BRIEF DESCRIPTION OF THE DRAWINGS

The exact nature of this invention, as well as other objects and advantages thereof, will readily be apparent from consideration of the following specification relating to the accompanying drawings, in which like reference characters designate the same or similar parts throughout the figures thereof and wherein.

DESCRIPTION OF THE PREFERRED EMBODIMENT

Detail description will hereunder be given of the preferred embodiment of a mechanism for driving a diffusion plate of strobe-lights according to this invention with reference to the accompanying drawings.

Figure 1:
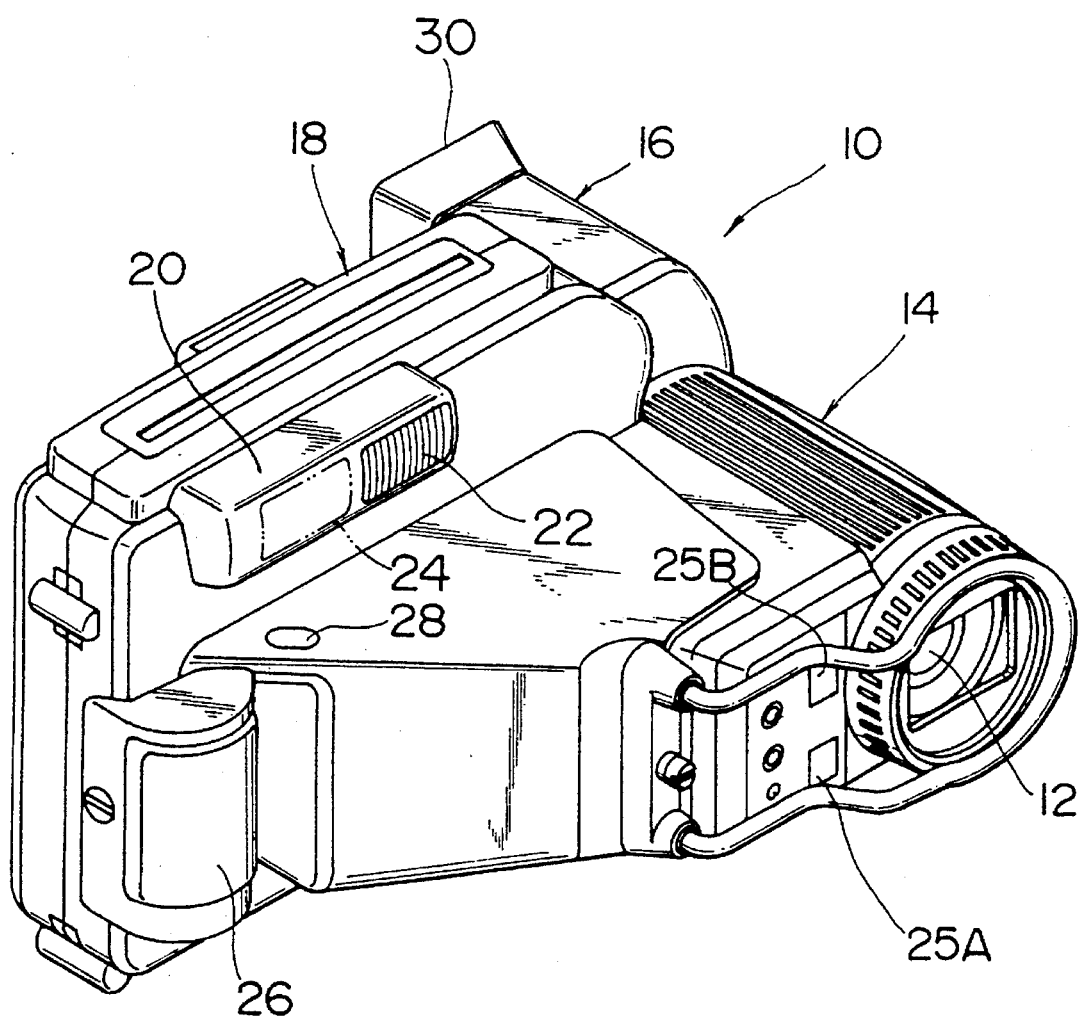
FIG 1 is a perspective view of a camera applied to a mechanism for driving a diffusion plate of strobe-lights according to this invention.

FIG. 1 is a perspective view showing an embodiment of a camera applied to a mechanism for driving a diffusion plate of strobe-lights according to this invention.

The camera 10, in which a lens barrel part 14 of a taking lens 12 is located at the front and the side of the camera body, a finder optical system 16 is arranged in the rear of the lens barrel part 14, and a storage part For an instant film cassette is placed in the rear of the camera body, respectively, is an instant camera whose whole plane shape is formed almost into a trapezoid.

A strobe storage part 20 is arranged on the camera body, and a strobe 22 is arranged in the right side of the strobe storage part 20 in FIG. 1. A rectangle-shaped diffusion plate 24, which is indicated by a two-dot chain line, is located in the strobe storage part 20. The diffusion plate 24 is moved slidably in the direction of the arrow in FIG. 5 by a mechanism for transmitting driving Force, described later, whereby it can move linearly to the front of the strobe 22.

An AF (Auto Focus) light-projecting window 25A and an AF (Auto Focus) light-receiving window 25B, which are members of an AF (Auto Focus) range finding section, are arranged on the front of the camera body and in the vicinity of the taking lens 12. A camera grip 26 is provided at the left side of the camera body in FIG. 1. A release button 28 of a shutter is located at a position in which it can be operated by a forefinger of the hand holding the camera grip 26. Further, a finder 30 is attached on the rear of the camera body.

Figure 2:
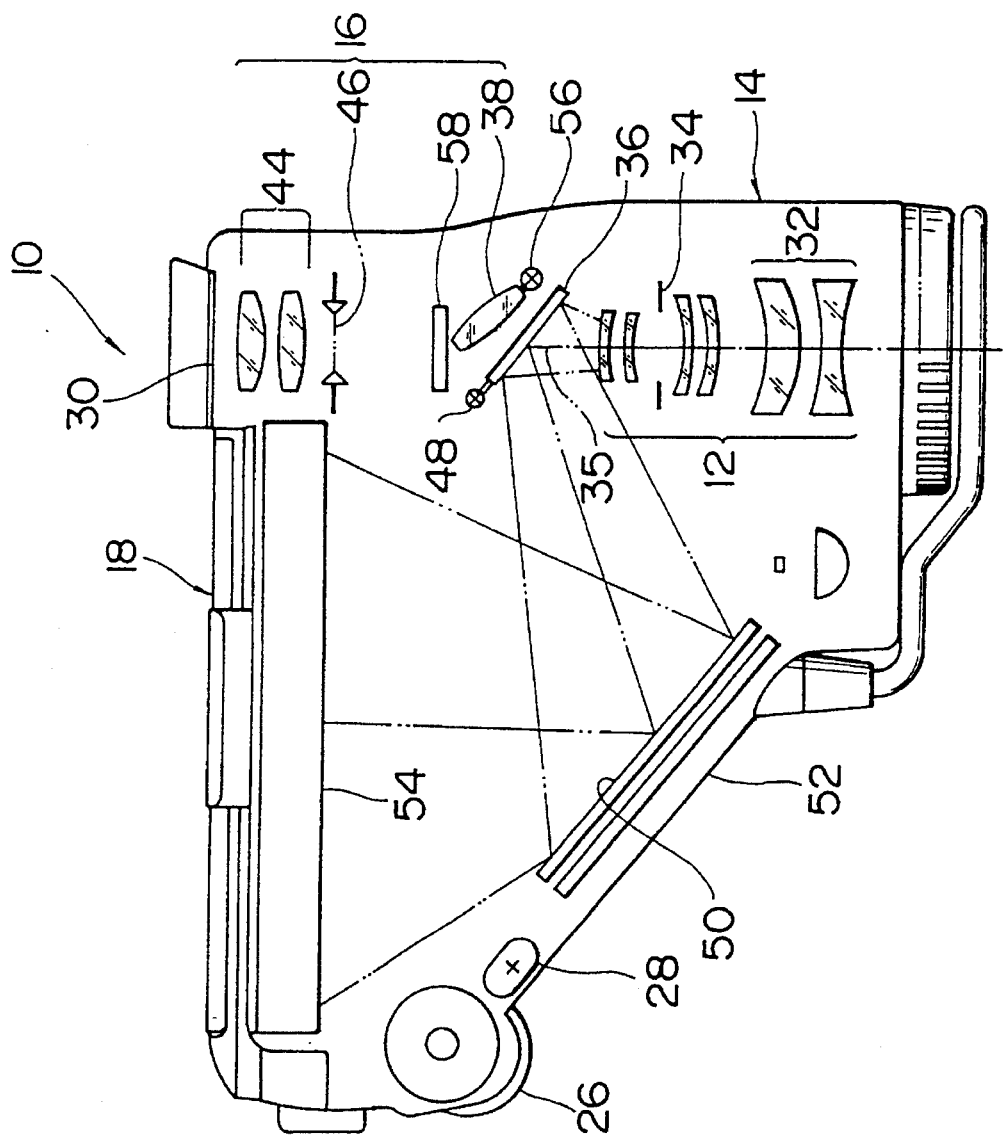
FIG. 2 is a plane view showing an embodiment of the optical system in the camera shown in FIG. 1.

The taking lens 12 of the camera 10 has a focus lens 32, as shown in FIG. 2. And, a diaphragm shutter 34 is located on the optical axis 35 of the taking lens 12. A first reflecting mirror 36 and the finder optical system 16 are placed behind the taking lens 12.

Figure 3:
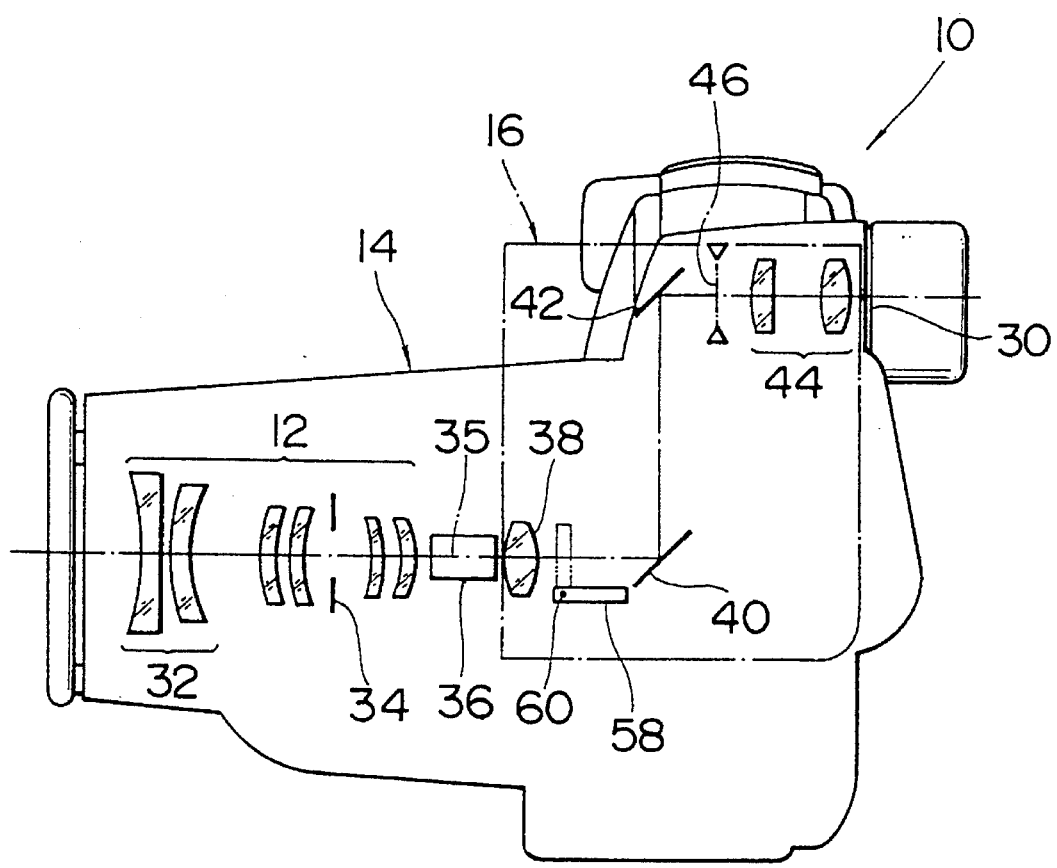
FIG. 3 is a side view of FIG. 2.

The finder optical system 16 consists of a relay lens 38, reflecting mirrors 40 and 42, and an eye piece 44, as shown in FIG. 3. The subject light, which is converged by the relay lens 38, is reflected upward by nearly 90° by the reflecting mirror 40 and reflected backward by nearly 90° by the reflecting mirror 42 to thereby be focused on the image-formation surface 46. The subject light, which is Focused on the image-formation surface 46, is adjusted by the eye piece 44 so as to be focused on the finder 30.

Figure 4:
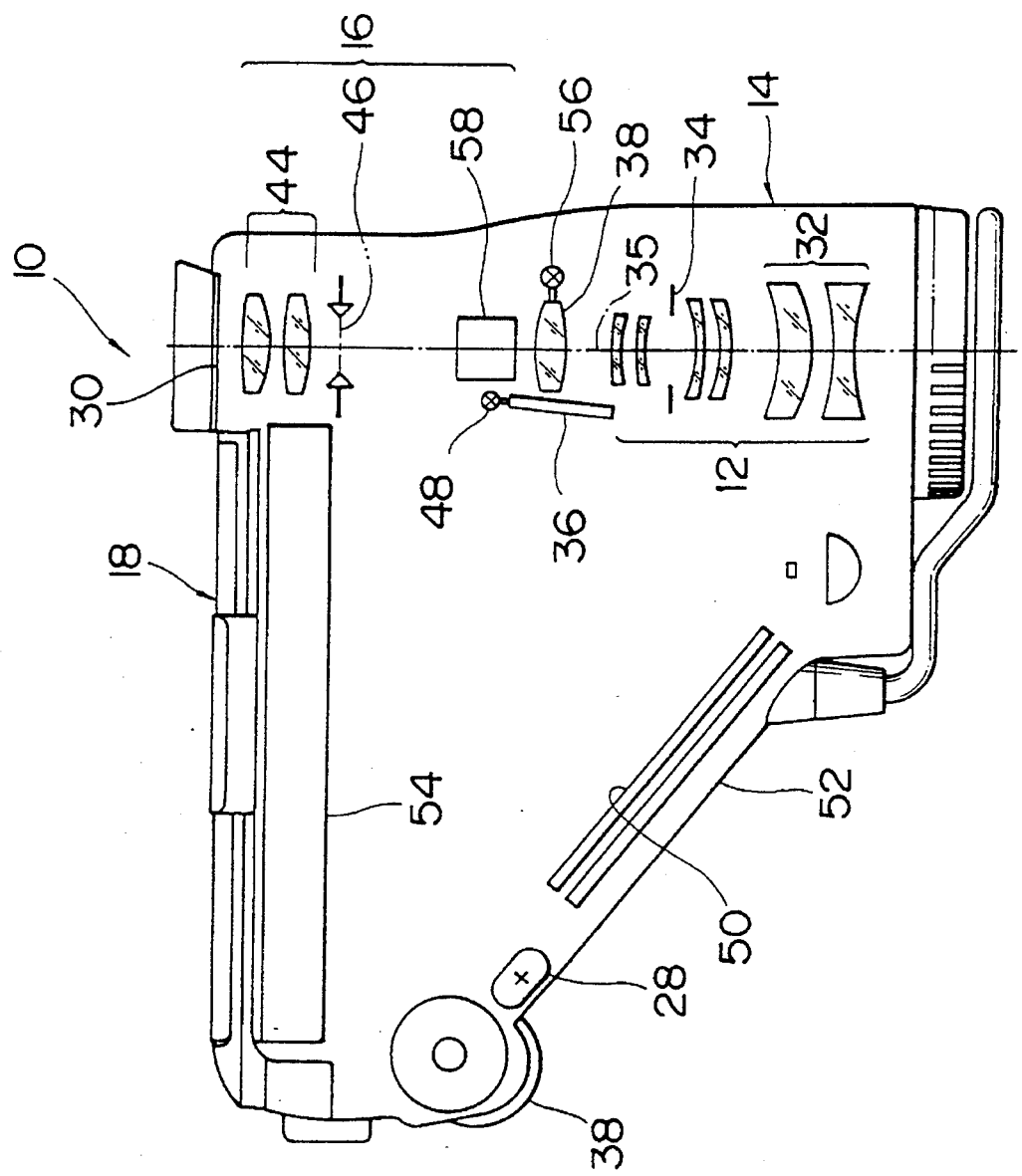
FIG. 4 is a plane view showing an embodiment of the optical system in the camera.

The First reflecting mirror 36 is provided in such a manner that it can rotate about a pin 48 between the position shown in FIG. 2 and that shown in FIG. 4, and positioned on the optical axis 35 in an interlocking relation with the complete pushing of the release button 28 (refer to FIG. 2). Therefore, the subject light is reflected obliquely Forward by the reflecting mirror 36 to the second reflecting mirror 50, which will be described hereunder. Further, the first reflecting mirror 36 is retracted From the optical axis 35 when the release button 28 is not released (refer to FIG. 4). Therefore, the subject light, which has passed through the taking lens 12, is introduced to the finder 30 through tile finder optical system 16.

On the other hand, the second reflecting mirror 50 is placed along the inside of a taper surface formed in the left side of the camera body as shown in FIG. 2, and reflects the subject light from the first reflecting 36 backward to fall on a film surface 54, whereby the instant film can be exposed. Therefore, the subject light, which has passed through the taking lens 12, is curved in the Z-shape by the first and second reflecting mirrors 36, 50 so as to expose the film surface 54.

The relay lens 38 is provided in such a manner that it can rotate about the pin 56 between the position shown in FIG. 2 and that shown in FIG. 4, and is retracted from the optical axis 35 in an interlocking relation with the complete pushing of the release button 28 (refer to FIG. 2). Further, the relay lens 38 is positioned on the optical axis 35 when the release button 28 is not released (refer to FIG. 4).

The diffusion plate 58 is located between the relay lens 38 and the reflecting mirror 40, as shown in FIG. 3. The diffusion plate 58 is provided in such a manner that it can rotate about the pin 60 between the position shown by the solid line and that shown by the two-dot chain line in FIG. 3, and is positioned on the optical axis 35 in an interlocking relation with the complete pushing of the release button 28 (refer to FIG. 2). Therefore, the harmful light from the finder 30 is shielded in front of the relay lens 38 when the release button 28 is released. The diffusion plate is in the position retracted from the optical axis 35 ( the position indicated by the solid line in FIG. 3) when the release button 28 is not operated.

Figure 5:
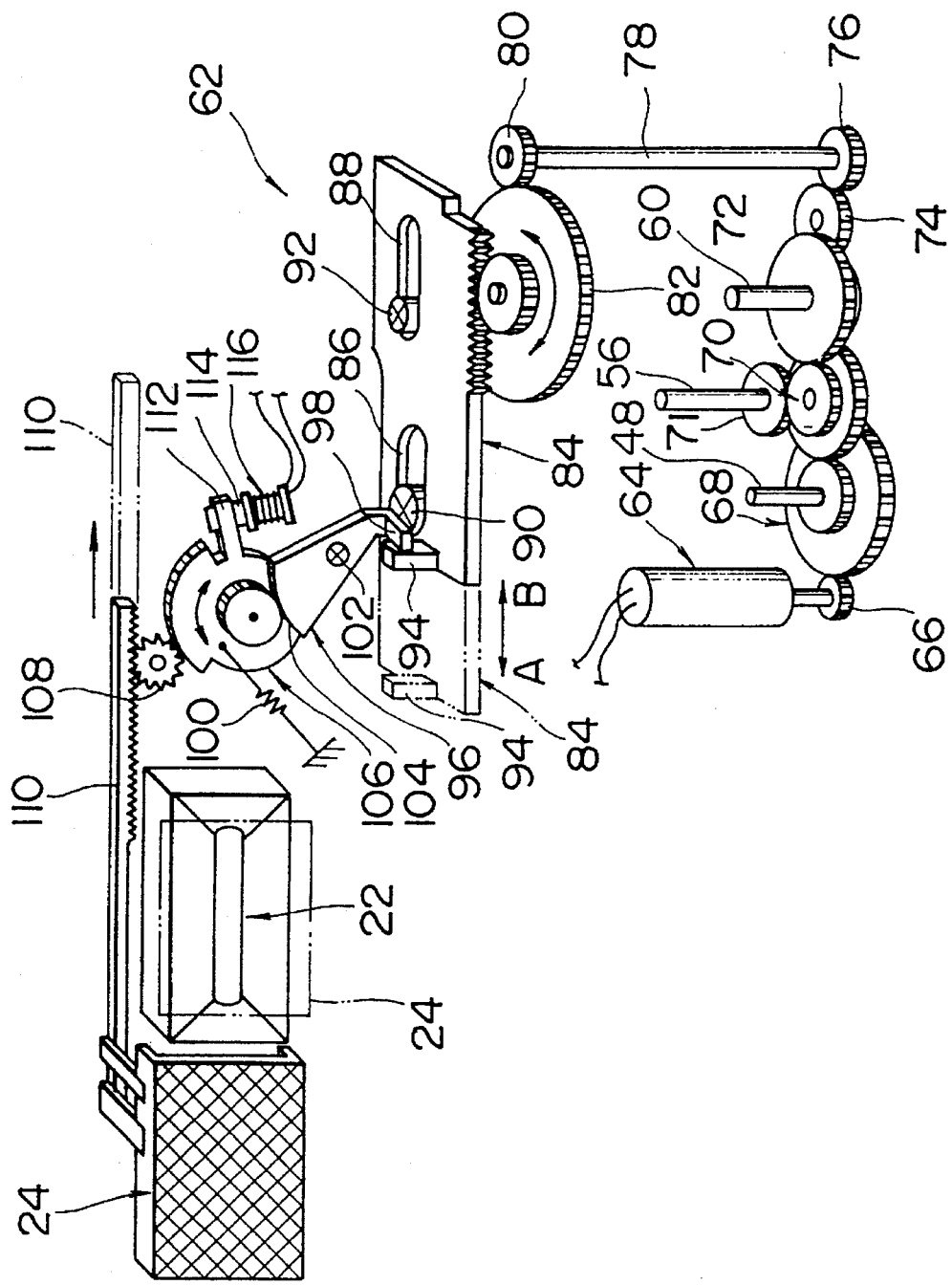
FIG. 5 is an explanatory view showing an embodiment of the mechanism for driving a diffusion plate of strobe-lights according to this invention.

FIG. 5 shows a structural view of a mechanism 62 for driving a diffusion plate of strobe-lights according to this invention.

The mechanism 62 For driving has a driving motor. A gear 66 in the driving motor 64 is meshed with a gear 68 for transmitting the driving force to the pin 48 of the first reflecting mirror 36 shown in FIG. 2, and the gear 68 is meshed with a gear 70. The gear 70 is meshed with a gear 71 for transmitting the driving force to the pin 56 of the relay lens 38 and a gear 72 for transmitting the driving force to the pin 60 of the diffusion plate 58 shown in FIG. 3.

The driving motor 64 is driven in an interlocking relation with the the releasing operation of the release button 28 shown in FIG. 1, and the gears 68, 70 and 72 are rotated by the driving force thereof, respectively, so that the first reflecting mirror 36, the relay lens 38 and the diffusion plate 58 can be rocked between the above-described predetermined positions, respectively.

The driving force for rotating, which is transmitted to the gear 72, is transmitted to a slide plate 84 through the gears 74 and 76, a rotation axis 78 and the gears 80 and 82. A pair of slots 86 and 88 are formed on the slide plate 84 in the longitudinal direction and guide pins 90 and 92 fixed to the camera body are arranged so as to be inserted in the slots 86 and 88.

Therefore, the slide plate is provided in such a manner that it can slide in the directions of the arrows A and B in FIG. 5 along the longitudinal direction of the slots 86 and 88, and is in the position indicated by tile solid line when the releasing button 28 is not released. When the releasing button 28 is released, the gear 82 is rotated counterclockwise, whereby the slide plate 84 is slid in the direction of the arrow A so as to be in the position indicated by the two-dot chain fine in FIG. 5. Moreover, when the release is finished, the gear 82 is rotated clockwise, whereby the slide plate 84 is slid in the direction of the arrow B so as to return to the former position indicated by the solid line.

An engageable pawl 94 is provided projectingly at the left end of the slide plate 84 in FIG. 5. A pawl 98 formed at the lower end of the gear 96 is abutted against the engageable pawl 94 by a spring 100, which will be described hereunder. The gear 96 is formed in the sector-shape and provided rotatably about a pin 102. Moreover, a gear part 104 Formed at the upper end of the gear 96 is meshed with a gear 106.

The gear 106 is rotated counterclockwise by the spring 100. The biasing force is transmitted to the gear 96 through the gear 106. With this arrangement, the gear 96 is rotated clockwise, so that the pawl 98 of the gear 96 is abutted against the engageable pawl 94 of the slide plate 84. Therefore, when the slide plate is slid in the direction of the arrow A in FIG. 5, the gear 96 rotates clockwise with the slide plate 84 and the gear 106 rotates counterclockwise.

The gear 106 is connected with a rack member 110 through a pinion gear 108. The rack member 110 is provided in the strobe storage part 20 shown in FIG. 1 and the diffusion plate 24 is fixed to the left end of the rack member 110. Therefore, the diffusion plate 24 is positioned in front of the strobe 22 to thereby cover when the gear 106 rotates counterclockwise and then the rack member 110 is in the position shown by the two-dot chain line in FIG. 5.

On the other hand, a projecting part 112 is formed at the periphery of the gear 106 and a magnet 114 is fixed thereto. Further, a magnetic actuator 116 is arranged at the position corresponding to the magnet 114.

The magnetic actuator 116 is controlled to be driven when the distance measured by the AF range finding section is, for example, 1 m or thereabove. When the magnetic actuator 116 is driven, the magnet 112 adsorbs thereto. With this arrangement, the gear 106 is locked.

Next, the explanation will be given of the action of the mechanism 62 for driving the diffusion plate of strobe-lights.

When the distance measured by the AF range finding sections 25A and 25B is 1 m or thereabove, that is, when photographing at a long distance, the magnetic actuator 116 is driven and adsorbs the magnet 114, whereby the gear 106 is locked.

With this arrangement, though the slide plate 84 is in the position indicated by the two-dot chain line in FIG. 5 in an interlocking relation with the releasing operation of the release button 28, it is not moved from the position retracted from the strobe 22 since the gear 106 is locked by the magnetic actuator 116.

On the other hand, when the distance measured by the AF range finding sections 25A and 25B is less than 1 m, that is, when photographing at a short distance, the magnetic actuator 116 is not driven, therefore, the gear 106 is rotated by the biasing Force of the spring 100.

With this arrangement, when the slide plate 84 is in the position indicated by the two-dot line in FIG. 5 in an interlocking relation with the releasing operation of the release button 28, the gear 106 is rotated counterclockwise by the biasing force of the spring 100, therefore, the slide plate 24 is slid to the front of the strobe 22 with the rack member 110 to cover the strobe 22. Therefore, the strobe-lights are diffused by the diffusion plate 24.

As a result, according to this embodiment, even if a large-capacity strobe is applied to the camera 10, the diffusion plate 24 covers the front of tile strobe 22 so as to diffuse the strobe-lights, so that the optimal exposure can be attained.

Incidentally, in this embodiment, the diffusion plate 24 is moved by the driving force of the motor 64 for driving the reflecting mirror 36, however, this invention should not be limited to this, another means For driving the diffusion plate may be provided, whereby the diffusion plate 24 may be retracted from the front off the strobe 22 by this means for driving a diffusion plate when the distance measured by the AF range finding section is of the predetermined value or thereabove, and the diffusion plate 24 may be moved in the front of the strobe 22 when the distance is of less than the predetermined value.

Further, in this embodiment, the description has been given of the case in that the mechanism 62 For driving the diffusion plate of strobe-lights is applied to the instant camera, however, this invention should not be limited to this, it may be applied to another type camera.

As has been described herein above, in the mechanism for driving a diffusion plate of strobe-lights according to this invention, when the distance measured by the AF range finding section is less than the predetermined value, the diffusion plate is advanced to the front of the strobe, so that the strobe is covered by the diffusion plate and the strobe-lights are diffused, therefore, even if a large-capacity strobe is applied, the optimal exposure can be attained while photographing at a short distance.

It should be understood, however, that there is no intention to limit the invention to the specific forms disclosed, but on the contrary, the invention is to cover all modifications, alternate constructions equivalents falling within the spirit and scope of the invention as expressed in the appended claims.

What is claimed is:

1. A mechanism for driving a diffusion plate of strobe-lights, comprising:

a camera body having a taking lens and an optical axis;

a strobe incorporated in said camera body;

an auto-focus range finding section secured to said camera body;

a diffusion plate of strobe-lights including means for linearly sliding said diffusion plate in front of and away from said strobe of said camera body in a plane perpendicular to said optical axis; and, driving means for sliding said diffusion plate to effect linear bodily displacement of said diffusion plate away from the front of said strobe when a distance measured by said auto-focus range finding section is at least equal to a predetermined value, and for sliding said diffusion plate to effect linear bodily displacement of said diffusion plate in front of said strobe when said distance is less than the predetermined value.

2. A mechanism for driving a diffusion plate of strobe-lights, comprising:

a camera body;

a strobe incorporated in said camera body;

an AF range finding section secured to said camera body;

a reflecting mirror for switching a subject light which has passed through a taking lens off to either the side of a finder or the side of an exposure surface of a film;

a means for driving a mirror, provided in said camera body, for rocking said reflecting mirror in an interlocking relation with a said easing operation of a shutter;

a diffusion plate of strobe-lights, which is linearly and movably provided in front of said strobe of said camera body;

a mechanism for driving said diffusion plate, for linearly moving said diffusion plate in front of said strobe by a driving force of said means for driving a mirror; and a means for interrupting a driving force, for interrupting the transmission of the driving force to said mechanism for driving said diffusion plate not to position it in front of said strobe when a distance measured by said AF range finding section is of a predetermined value or thereabove, and for positioning said diffusion plate in front of said strobe by said means for driving a mirror when said distance is of less than the predetermined value.

3. A mechanism for driving a diffusion plate of strobe-lights as set forth in claim 2, wherein said means for interrupting a driving force comprises:

a magnet secured to said mechanism for driving said diffusion plate; and an electromagnetic actuator for being driven to attract said magnet and to interrupt the transmission of the driving force to the mechanism for driving said diffusion plate of said means for driving the mirror when the distance measured by said AF range finding section is of the predetermined value or thereabove.

4. A mechanism for driving a diffusion plate of strobe-lights as set forth in claim 2, characterized in that an optical system of said finder, comprising:

a relay lens which is linearly and movably provided relative to an optical axis, for causing the subject light to focus at a surface of image formation; and an eye piece-for focusing a subject image which has been made to focus at said surface of image-formation; wherein said relay lens is linearly moved by the driving force of said means for driving a mirror, and moved to a position of said reflecting mirror before being switched off to the side of the finder, when the relay lens is advanced to the optical axis.

5. A mechanism for driving a diffusion plate of strobe-lights as set forth in claim 2, wherein said optical system of the finder is linearly and movably provided relative to the optical axis with a light shielding plate for preventing a harmful light from falling into the exposure surface of the film during photographing, said light shielding plate is advanced to the optical axis during photographing through the driving force from said means for driving a mirror.

* * * * *